United States Patent [19]
Bement et al.

[11] Patent Number: 6,100,230
[45] Date of Patent: Aug. 8, 2000

[54] AZEOTROPE-LIKE COMPOSITIONS OF PENTAFLUOROPROPANE, HYDROCARBONS AND WATER

[75] Inventors: Leslie Bruce Bement; Mary Charlotte Bogdan; Peter Brian Logsdon; Hang Thanh Pham; Ronald Riegal; David John Williams; Kevin Donald Uhrich, all of Erie County, N.Y.

[73] Assignee: AlliedSignal Inc., Morristown, N.J.

[21] Appl. No.: 09/267,999

[22] Filed: Mar. 15, 1999

[51] Int. Cl.[7] .................................................... C11D 17/08
[52] U.S. Cl. ........................ 510/415; 252/364; 510/177; 521/131
[58] Field of Search .................................. 510/177, 415; 252/364; 521/131

[56] References Cited

U.S. PATENT DOCUMENTS

| | | |
|---|---|---|
| 2,834,748 | 5/1958 | Bailey . |
| 2,846,458 | 8/1958 | Haluska . |
| 2,917,480 | 12/1959 | Bailey . |
| 5,391,317 | 2/1995 | Smits ....................... 521/131 |
| 5,496,866 | 3/1996 | Sommerfeld . |
| 5,646,196 | 7/1997 | Sommerfeld . |
| 5,672,294 | 9/1997 | Lund et al. ................ 252/67 |
| 5,677,358 | 10/1997 | Lund et al. ............... 521/131 |
| 5,716,541 | 2/1998 | Werner et al. ............. 252/67 |
| 5,759,438 | 6/1998 | Lund et al. ................ 510/415 |
| 5,840,212 | 11/1998 | Doerge . |
| 5,889,066 | 3/1999 | Doerge . |
| 5,895,793 | 4/1999 | Kitamura et al. .......... 521/131 |

*Primary Examiner*—John M. Cooney, Jr.
*Attorney, Agent, or Firm*—Jay D. Friedenson; Marie L. Collazo

[57] ABSTRACT

This invention provides compositions of 1,1,1,3,3-pentafluoropropane, water and at least one hydrocarbon selected from the group consisting of n-pentane, isopentane, cyclopentane and hexane that are environmentally desirable for use as refrigerants, aerosol propellants, metered dose inhalers, blowing agents for polymer foam, heat transfer media, and gaseous dielectrics.

7 Claims, 1 Drawing Sheet

AZEOTROPE-LIKE COMPOSITIONS OF PENTAFLUOROPROPANE, HYDROCARBONS AND WATER

FIELD OF THE INVENTION

The present invention relates to azeotrope-like mixtures of 1,1,1,3,3-pentafluoropropane ("HFC-245fa"), water ("$H_2O$") and at least one hydrocarbon. The compositions of the invention are environmentally desirable for use as refrigerants, in centrifugal chillers, aerosol propellants, metered dose inhalers, fire extinguishers, blowing agents for polymer foam, heat transfer media, solvents, and gaseous dielectrics.

BACKGROUND OF THE INVENTION

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, it is desirable to use fluids of no ozone depletion potential such as hydrofluorocarbons, ("HFC's").

Thus, the use of fluids that do not contain chlorofluorocarbons ("CFC's") or hydrochlorofluorocarbons ("HCFC's" is desirable). Additionally, it is known that the use of single component fluids or azeotropic mixtures, which mixtures do not fractionate on boiling and evaporation, is desirable. However, the identification of new, environmentally safe, azeotropic mixtures is complicated due to the fact that it is difficult to predict azeotrope formation.

The art continually is seeking new fluorocarbon based mixtures that offer alternatives, and are considered environmentally safer substitutes for CFC's and HCFC's. Of particular interest are mixtures containing a fluorocarbon and a non-fluorocarbon, both of low ozone depletion potentials. Such mixtures are the subject of this invention.

DESCRIPTION OF THE INVENTION AND PREFERRED EMBODIMENTS

This invention provides azeotrope-like compositions of HFC-245fa, water and at least one hydrocarbon selected from the group consisting of n-pentane, isopentane, cyclopentane and hexane ($C_5$–$C_6$ hydrocarbons). The compositions of the invention provide environmentally desirable, zero ozone depletion potential replacements for currently used CFC's and HCFC's. Additionally, the compositions of the invention exhibit characteristics that make the compositions better CFC and HCFC substitutes than any of HFC-245fa, $C_5$–$C_6$ hydrocarbons or water alone.

One embodiment of the invention provides azeotrope-like compositions comprising HFC-245fa, water and at least one hydrocarbon selected from the group consisting of n-pentane, isopentane, cyclopentane and hexane. More specifically, the invention provides azeotrope-like compositions comprising from about 65 to about 98 weight percent HFC-245fa, from about 34 to about 1 weight percent of at least one hydrocarbon selected from the group consisting of n-pentane, isopentane, cyclopentane and hexane, and from about 34 to about 1 weight percent water, which compositions have a boiling point of 10° C.±4 preferably ±1° C., at 760 mm Hg pressure. The preferred, more preferred, and most preferred compositions of the invention are set forth in Table 1. The numerical ranges in Table 1 are to be understood to be prefaced by the term "about".

TABLE 1

| Components | Preferred (wt %) | More Preferred (wt %) | Most Preferred (wt %) |
|---|---|---|---|
| HFC-245fa | 65–98 | 75–98 | 85–98 |
| $C_5$—$C_6$ Hydrocarbons | 34–1 | 24–1 | 15–1 |
| Water | 34–1 | 24–2 | 15–3 |

The invention relates to a method of preparing polyurethane and polyisocyanurate foam compositions comprising the step of reacting and foaming a mixture of ingredients which react to form polyurethane or polyisocyanurate foams in the presence of a blowing agent comprising an azeotrope-like composition consisting essentially of preferably from about 65 to about 98 weight percent, more preferably from about 75 to about 98, most preferably form about 85 to about 98 weight percent HFC-245fa; from about 34 to about 1, more preferably from about 24 to about 1, most preferably from about 15 to about 1 weight percent of at least one hydrocarbon selected from the group consisting of n-pentane, isopentane, cyclopentane and hexane; and preferably from about 34 to about 1, more preferably from about 15 to about 2, most preferably from about 15 to about 3 weight percent water.

The invention further relates to a closed cell foam prepared from a polymer foam formulation containing a blowing agent comprising an azeotrope-like composition consisting essentially of preferably from about 65 to about 98 weight percent, more preferably from about 75 to about 98, most preferably form about 85 to about 98 weight percent HFC-245fa; from about 34 to about 1, more preferably from about 24 to about 1, most preferably from about 15 to about 1 weight percent of at least one hydrocarbon selected from the group consisting of n-pentane, isopentane, cyclopentane and hexane; and preferably from about 34 to about 1, more preferably from about 15 to about 2, most preferably from about 15 to about 3 weight percent water.

In another embodiment, the invention provides a closed cell foam containing a cell gas comprising a blowing agent comprising an azeotrope-like composition consisting essentially of preferably from about 65 to about 98 weight percent, more preferably from about 75 to about 98, most preferably form about 85 to about 98 weight percent HFC-245fa; from about 34 to about 1, more preferably from about 24 to about 1, most preferably from about 15 to about 1 weight percent of at least one hydrocarbon selected from the group consisting of n-pentane, isopentane, cyclopentane and hexane; and preferably from about 34 to about 1, more preferably from about 15 to about 2, most preferably from about 15 to about 3 weight percent water.

The invention further relates to a blowing agent composition comprising an azeotrope-like composition consisting essentially of preferably from about 65 to about 98 weight percent, more preferably from about 75 to about 98, most preferably form about 85 to about 98 weight percent HFC-245fa; from about 34 to about 1, more preferably from about 24 to about 1, most preferably from about 15 to about 1 weight percent of at least one hydrocarbon selected from the group consisting of n-pentane, isopentane, cyclopentane and hexane; and preferably from about 34 to about 1, more preferably from about 15 to about 2, most preferably from about 15 to about 3 weight percent water.

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a nonazeotropic mixture into its separate components. If the mixture containing the additional component is nonazeotropic or nonazeotrope-like, the additional component will fractionate from the azeotropic or azeotrope-like components. If the mixture is azeotrope-like, some finite amount of a first distillation. cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

The compositions of the invention meet the need in the art for HFC mixtures that have no ozone depletion potential and are negligible contributors to greenhouse global warming. Further, because the azeotrope-like compositions of the invention exhibit constant vapor pressure characteristics and relatively minor composition shifts as the liquid mixture is evaporated, the azeotrope-like composition of the invention are comparable to a constant boiling single component composition.

In another process embodiment, the compositions of the invention are used in a method for producing polyurethane and polyisocyanurate foams. Any of the methods well known in the art such as those described in "Polyurethanes Chemistry and Technology," Volumes I and II, Saunders and Frisch, 1962, John Wiley and Sons, New York, N.Y. In general, the method comprises preparing polyurethane or polyisocyanurate foams by combining an isocyanate, a polyol or mixture of polyols, a blowing agent or mixture of blowing agents, and other materials such as catalysts, surfactants, and optionally, flame retardants, colorants, or other additives. The blowing agent or agents employed shall be a volatile mixture of the azeotrope-like compositions of the present invention.

It is convenient in many applications to provide the components for polyurethane or polyisocyanurate foams in preblended formulations. Most typically, the foam formulation is preblended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B component as described above.

It is also possible to produce thermoplastic foams using the compositions of the invention. For example, conventional foam polyurethanes and isocyanurate formulations may be combined with the azeotrope-like compositions in a conventional manner to produce rigid foams.

Azeotrope-like mixtures containing HFC-245fa are particularly suitable as foam blowing agents since foams blown with HFC-245fa have been found to possess low relative initial and aged thermal conductivity and good dimensional stability at low temperatures. Of particular interest are those mixtures that contain HFC-245fa and other zero ozone depleting materials, such as, for example, other hydrofluorocarbons, e.g., difluoromethane (HFC-32), difluoroethane (HFC-152), trifluoroethane (HFC-143), tetrafluoroethane (HFC-134), pentafluoropropane (HFC-245), hexafluoropropane (HFC-236), heptafluoropropane (HFC-227); and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917, 480, and 2,846,458. Other optional additives for the blowing agent mixture may include flame retardants such as tris(2-chloroethyl)phosphate, tris(2-chloropropyl)phosphate, tris (2,3-dibromopropyl)-phosphate, tris(1,3-dichloropropyl) phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of HFC-245fa per 100 parts by weight of polyol are used.

In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

The present invention is more fully illustrated by the following, non-limiting examples.

EXAMPLES

Example 1

An ebulliometer consisting of vacuum-jacketed tube with a condenser on top was used. About 20 g HFC-245fa was charged to the ebulliometer, then cyclopentane was added in small, measured increment, and water was added in small, measured increments. The temperature was measured using a platinum resistance thermometer. We observed the temperature depression when cyclopentane and water were added to HFC-245fa, which indicates a ternary minimum boiling azeotrope is formed. The measurements show that from about 0.1 to about 34 weight percent cyclopentane, and from 0.1 to 9 weight percent of water, the boiling point of the composition changed by about 3° C.

Example 2

An ebulliometer consisting of vacuum-jacketed tube with a condenser on top was used. About 17 g HFC-245fa was charged to the ebulliometer, then isopentane was added in small, measured increment, and water was added in small, measured increments. The temperature was measured using a platinum resistance thermometer. We observed the temperature depression when isopentane and water were added to HFC-245fa, which indicates that a ternary minimum boiling azeotrope is formed. The measurement show that from about 0.1 to about 27 weight percent isopentane, and from 0.1 to 9 weight percent of water, the boiling point of the composition changed by about 7° C. Therefore, the composition is constant-boiling over this range.

Example 3

An ebulliometer consisting of vacuum-jacketed tube with a condenser on top was used. About 12 g HFC-245fa was charged to the ebulliometer, then hexane was added in small, measured increment, and water was added in small, measured increments. The temperature was measured using a platinum resistance thermometer. We observed the temperature depression when hexane and water were added to HFC-245fa, which indicates that a ternary minimum boiling azeotrope is formed. The measurement show that from about 0.1 to about 11 weight percent hexane, and from 0.1 to 24 weight percent of water, the boiling point of the composition changed by about 1° C.

Example 4

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of the azeotrope-like composition of Example 1 as blowing agent. The resulting mixture is foamed with 152 g of crude 4,4' diisocyanato-diphenylmethane. The resulting rigid foam is inspected and found to be of good quality.

Example 5

In this example, shows that foams prepared using the azeotrope-like compositions of the invention as a foam blowing agent exhibit improved k-factors. In general the formulations used to prepare these foams is described in Table 4.

TABLE 4

| Component (pbw) | | | |
| --- | --- | --- | --- |
| Terate 2541[1] | 100.00 | 100.00 | 100.00 |
| Tegostab B8503[2] | 2.00 | 2.00 | 2.00 |
| Polycat 8[3] | 0.4 | 0.50 | 0.63 |
| Dabco K-15[3] | 3.00 | 3.80 | 5.60 |
| Water | 0.5 | 0.5 | 0.5 |
| HFC-245fa | 35.00 | 17.5 | 0 |
| Isopentane | 0 | 9.4 | 18.7 |
| Lupranate M70L[4] | 168 | 168 | 168 |
| Index | 250 | 250 | 250 |

[1]Polyol from COSA; hydroxyl number = 240
[2]Surfactant from GoldschmidtChemical Company
[3]Catalyst from Air Products & Chemicals Inc.
[4]A Polymethylene poly(phenyl isocyanate) mixture containing about 40% by weight of methylenebis(phenyl isocyanate) with the balance being polymethylene poly(phenyl isocyanate) having a functionality greater than 2; isocyanate equivalent weight = about 134; from BASF Corp.

The same general procedure commonly referred to as "handmixing" was used to prepare all foams. For each blowing agent or blowing agent pair, a premix of polyol, Terate 2541, surfactant, Tegostab B8433, and catalyst, Dabco K-15 and Polycat 8, was prepared in the same proportions displayed in Table 4. About 2 kg was blended to insure that all of the foams in a given series were made with the same master batch of premix. The premix was blended in a one-gallon paint can, and stirred at about 1500 rpm with a Conn 2" diameter ITC mixer until a homogenous blend was achieved. When mixing was complete the material was transferred to a one-gallon glass bottle and sealed. The bottle was then placed in a refrigerator controlled at 32° F. The foam blowing agents were kept separately in the same refrigerator, along with the 32 ounce. tin cans used for mixing vessels. The A-component, isocyanate, was kept in sealed containers at 70° F.

For the individual foam preparations, an amount of B-component equal to the formulation weight was weighted into a 32-oz tin can preconditioned at 32° F. To this was added the required amounts of he individual blowing agents., also preconditioned to 32° F. The contents were stirred for two-minutes with a Conn 2" ITC mixing blade turning at about 1000 rpm. Following this, the mixing vessel and contents were reweighed. If there was a weight loss, the lower boiling blowing agent was added to make up the loss. The contents were stirred for an additional 30 seconds, and the can replaced in the refrigerator.

After the contents have cooled again to 32° F., approximately 10 minutes, the mixing vessel was removed from the refrigerator and taken to the mixing station. A pre-weighed portion of A-component, isocyanate, was added quickly to the B-component, the ingredients mixed for 10 seconds using a Conn 2" diameter ITC mixing blade at 3000 rpm and poured into a 8"×8"×4" cardboard cake box and followed to rise. Cream, initiation, gel and tack free times were recorded for the individual polyurethane foam samples.

The foams were allowed to cure in the boxes at room temperature for at least 24 hours. After curing, the blocks were trimmed to a uniform size and densities measured. Any foams that did not meet the density specification 2.0±0.1 lb/ft$^3$ were discarded, and new foams prepared using an adjusted amount of blowing agent in the formulation to obtain the specified density.

BRIEF DESCRIPTION OF DRAWINGS

After ensuring that all the foams meet the density specifications, the foams were tested for k-factor according to ASTM C518. The k-factor results are displayed in FIG. 1. This graph illustrates that by using the azeotrope-like blends of the invention as the foam blowing agent instead of only water the k-factors of the foams dramatically improve. The improvement is unexpectedly nonlinear.

In addition to the difference in k-factor, there is a difference in the density of the foams produced with these formulations. This is illustrated in Table 5.

TABLE 5

Figure 1:
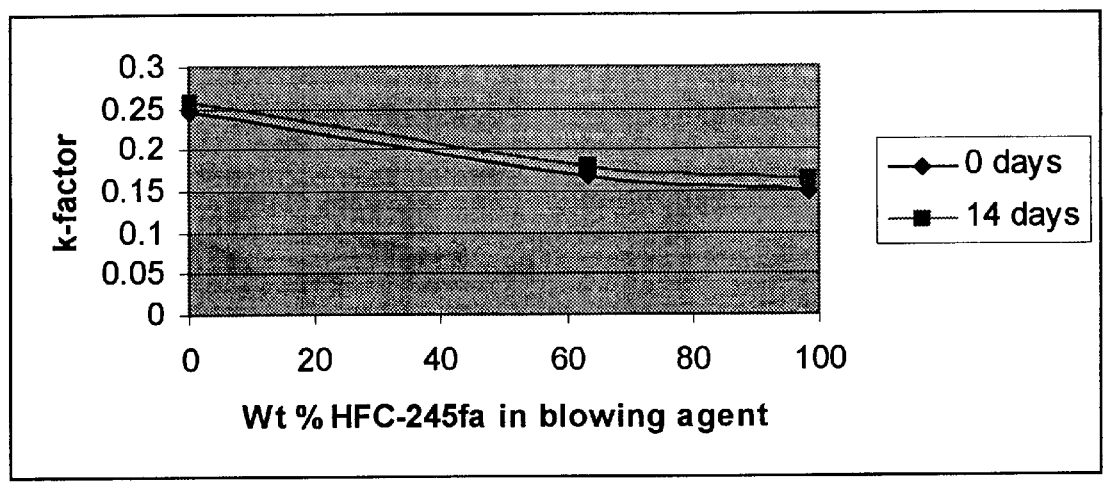

Wt % Blowing Agent vs. Foam Density

| Wt % HFC-245fa | Wt % Isopentane | Wt. % Water | Foam density (pcf) |
|---|---|---|---|
| 98.6 | 0 | 1.4 | 1.91 |
| 0 | 97.4 | 2.6 | 1.87 |
| 63.5 | 34.3 | 1.8 | 1.77 |

This table indicates that the azeotrope-like compositions of the invention produce foams with significantly lower foam density for the same molar equivalent of blowing agent.

Example 6

We have found that HFC-245fa aids in solubilizing $C_5$–$C_6$ hydrocarbons and blends thereof in the B-component. To demonstrate this effect 0.18 moles of isopentane are added to 50 g of Terate 2541LC[1] in a Fischer porter tube. The heights of the layers present in the tube were recorded. The test was than repeated with increasing concentrations of HFC-245fa. The following table summarizes the results of this study.

Improved miscibility of hydrocarbons in B-side with addition of HFC-245fa

| Blowing Agent | Moles | Moles | Moles |
|---|---|---|---|
| Isopentane | 0.18 | 0.13 | 0.09 |
| HFC-245fa | 0 | 0.05 | 0.09 |
| % hydrocarbon layer of polyol blowing agent mixture | 29.8 | 26.3 | 20.3 |

Additionally, we have found that the order of addition of the components is critical in the optimization of the foam results. HFC-245fa enhances the miscibility of the hydrocarbons in the B-component if it is added as a preblended mixture with the hydrocarbon or added to the B-component prior to addition of the hydrocarbon. The following table illustrates this phenomenon when 6 grams of each blowing agent is added with a constant concentration of water to Stepanol 2352.

Improved miscibility of hydrocarbons in B-side with addition of HFC-245fa

| Blowing Agent | Order of addition | | |
|---|---|---|---|
| Isopentane | First | Second | Blended |
| HFC-245fa | Second | First | Blended |
| % hydrocarbon layer of polyol blowing agent mixture | 62.2 | 20.4 | 20.4 |

The improvement in miscibility was unexpected and is believed to contribute to the inherent stability of the B-component.

What is claimed is:

1. Azeotrope-like compositions consisting essentially of 1,1,1,3,3-pentafluoropropane, water and at least one hydrocarbon selected from the group consisting of n-pentane, isopentane, cyclopentane and hexane, which compositions have a boiling point of 10±4° C. at 760 mm Hg.

2. The azeotrope-like composition of claim 1 consisting essentially of from about 65 to about 98 weight percent 1,1,1,3,3-pentafluoropropane, from about 1 to about 34 weight percent water and from about 1 to about 34 weight percent of at least one hydrocarbon selected from the group consisting of n-pentane, isopentane, cyclopentane and hexane.

3. The azeotrope-like composition of claim 1 consisting essentially of from about 75 to about 98 weight percent 1,1,1,3,3-pentafluoropropane, from about 2 to about 24 weight percent water and from about 1 to about 24 weight percent of at least one hydrocarbon selected from the group consisting of n-pentane, isopentane, cyclopentane and hexane.

4. The azeotrope-like composition of claim 1 consisting essentially of from about 85 to about 98 weight percent 1,1,1,3,3-pentafluoropropane, from about 3 to about 15 weight percent water and from about 1 to about 15 weight percent of at least one hydrocarbon selected from the group consisting of n-pentane, isopentane, cyclopentane and hexane.

5. A blowing agent comprising the azeotrope-like composition of claim 1.

6. A blowing agent comprising the azeotrope-like composition of claim 2.

7. A blowing agent comprising the azeotrope-like composition of claim 3.

* * * * *